(12) United States Patent
Hayton

(10) Patent No.: US 9,610,760 B2
(45) Date of Patent: Apr. 4, 2017

(54) METHOD OF FORMING A PERFORATED COMPOSITE PANEL

(71) Applicant: ROLLS-ROYCE PLC, London (GB)

(72) Inventor: Paul Robert Hayton, Bristol (GB)

(73) Assignee: ROLLS-ROYCE plc, London (GB)

( * ) Notice: Subject to any disclaimer, the term of this patent is extended or adjusted under 35 U.S.C. 154(b) by 293 days.

(21) Appl. No.: 14/445,366

(22) Filed: Jul. 29, 2014

(65) Prior Publication Data

US 2015/0041056 A1 Feb. 12, 2015

(30) Foreign Application Priority Data

Aug. 7, 2013 (GB) .................................. 1314142.9

(51) Int. Cl.
*B32B 37/12* (2006.01)
*B32B 38/00* (2006.01)
(Continued)

(52) U.S. Cl.
CPC .......... *B32B 38/0004* (2013.01); *B23B 35/00* (2013.01); *B32B 3/266* (2013.01); *B32B 38/04* (2013.01); *B32B 41/00* (2013.01); *B23B 2215/04* (2013.01); *B23B 2228/36* (2013.01); *B23B 2270/58* (2013.01); *B32B 37/12* (2013.01); *B32B 2038/047* (2013.01);
(Continued)

(58) Field of Classification Search
CPC ..... B32B 37/12; B32B 38/0004; B32B 41/00; Y10T 156/1056; Y10T 156/1057
See application file for complete search history.

(56) References Cited

U.S. PATENT DOCUMENTS 4,332,066 A 6/1982 Hailey et al.
4,696,711 A * 9/1987 Greszczuk ............ B29C 70/545
156/173
(Continued)

FOREIGN PATENT DOCUMENTS

GB 2 428 211 A 1/2007
WO WO 2005/120752 A1 12/2005

OTHER PUBLICATIONS

Feb. 5, 2014 British Search Report issued in British Application No. 1314142.9.

*Primary Examiner* — Mark A Osele
*Assistant Examiner* — Christopher C Caillouet
(74) *Attorney, Agent, or Firm* — Oliff PLC

(57) ABSTRACT

A perforated composite panel comprises a substrate and an applied layer, the substrate having a first surface and an opposite second surface. A method of forming the perforated composite panel comprises the steps of:
  i. cutting a plurality of first holes in the substrate;
  ii. positioning the applied layer against the substrate such that a surface of the applied layer overlays the first surface of the substrate to thereby form the composite panel;
  iii. locating the composite panel in a fixture, the fixture having one or more datum features;
  iv. determining the location and axis direction for each of the first holes in the substrate, relative to the or each datum feature; and
  v. cutting a plurality of second holes in the applied layer, each of the plurality of second holes being coincident and coaxial with a corresponding one of the plurality of first holes.

10 Claims, 3 Drawing Sheets

(51) Int. Cl.
  *B32B 41/00*    (2006.01)
  *B32B 38/04*    (2006.01)
  *B32B 3/26*    (2006.01)
  *B23B 35/00*    (2006.01)

(52) U.S. Cl.
  CPC ..... *B32B 2262/106* (2013.01); *B32B 2311/18* (2013.01); *Y10T 156/1056* (2015.01); *Y10T 156/1057* (2015.01)

(56) References Cited

U.S. PATENT DOCUMENTS

| | | | | |
|---|---|---|---|---|
| 6,099,212 A | * | 8/2000 | Marocco | B23B 39/161 144/3.1 |
| 8,021,089 B2 | * | 9/2011 | Eriksson | B23B 35/005 408/1 R |

* cited by examiner

METHOD OF FORMING A PERFORATED COMPOSITE PANEL

FIELD OF THE INVENTION

The present invention relates to a method of forming a perforated panel and particularly to a method of forming a perforated composite panel.

BACKGROUND TO THE INVENTION

In a typical aircraft propulsion system it is known to use liner panels to isolate the hot exhaust gas stream from the exhaust casing and to thereby form a guided path for the cooling air flow. To prevent the hot gas stream from overheating the liner panel it is known to incorporate holes in the liner panel, through which cooling air is flowed. This creates a barrier of cool air between the hot exhaust gas stream and the exhaust casing.

This cooling air is typically directed at an angle to the liner panel in order to increase the cooling efficiency, to minimise entry losses, to improve the mixing between the exhaust gas stream and the cooling air flow. This angle may be up to 70 degrees to the exhaust liner surface normal.

These cooling holes are typically formed by laser or electron beam due to the large quantity of holes that must be formed. Furthermore the use of conventional machining methods such as, for example drilling or milling, would be impractical as the cutting tool would skid as soon as it touched down on the surface of the panel.

While a drill guide could be used for drill location it is likely that the drill would be susceptible to breakage at such shallow angles to the substrate surface. Furthermore the use of end mills would be time-consuming and expensive.

STATEMENTS OF INVENTION

According to a first aspect of the present invention there is provided a method of producing a perforated composite panel, the composite panel comprising a substrate and an applied layer, the substrate having a first surface and an opposite second surface, the method comprising the steps of:
  i. cutting a plurality of first holes in the substrate;
  ii. positioning the applied layer against the substrate such that a surface of the applied layer overlays the first surface of the substrate to thereby form the composite panel;
  iii. locating one or more datum features on the composite panel;
  iv. determining the location and axis direction for each of the first holes in the substrate, relative to the or each datum feature; and
  v. cutting a plurality of second holes in the applied layer, each of the plurality of second holes being coincident and coaxial with a corresponding one of the plurality of first holes.

In one embodiment of the invention, the liner panel may comprise of one or more applied layers attached to a substrate where the applied layer materials have a different resistance to machining than the substrate. The applied layers may be used to provide corrosion protection or thermal insulation to the substrate.

The drilling of a through-hole by conventional methods may be impractical as it may cause damage to the applied layers. Furthermore, the chemical composition of the applied layers may not be suited to heating, for example by a laser.

Optionally, step ii. comprises the additional subsequent step of:
  ii.' adhesively bonding the surface of the applied layer to the first surface of the substrate.

In one embodiment of the invention, the applied layer is bonded to the substrate with an adhesive. This is a convenient and simple process for a user.

In alternative arrangements, the applied layer may be bonded to the substrate using an alternative joining technique such as, for example riveting.

Optionally, step i. comprises the additional initial step of:
  i.' forming the substrate into a predetermined shape.

In an embodiment of the invention where the composite panel takes a simple curved shape, the step of forming the substrate is performed before the plurality of holes are cut into the substrate. Since the shape of the composite panel embodies simple curves the step of forming the panel does not result in significant distortion to the positional arrangement of the plurality of holes.

Optionally, step i. comprises the additional subsequent step of:
  i.' forming the substrate into a predetermined shape.

In an embodiment of the invention where the shape of the finished composite panel is a complex one it may be necessary to first form the substrate into the required geometrical form and then to subsequently cut into the formed substrate the plurality of holes. This has the advantage that the forming process does not cause distortion of the positional arrangement of the plurality of holes.

Optionally, one or more supports are attached to the second surface of the substrate.

This enables the composite panel to be easily attached to the structure of an exhaust duct. Since the second surface is opposite to the first surface over which the main exhaust gas flow passes, the supports do not reduce the flow efficiency of the exhaust gas flow.

Optionally, the substrate is formed from a first material and the applied layer is formed from a second material, a hardness of the first material being greater than a corresponding hardness of the second material.

An advantage of the method of the present invention is that since the materials of the substrate and the applied layers have different machinability indices it becomes possible for a first formed hole in the harder, first material to act as a guide for a subsequent forming operation to cut a corresponding hole into the softer, second material.

Optionally, the axis of each of the first holes is inclined at an acute angle to the plane of the substrate.

The enables the flow of cooling air exiting the holes and entering the exhaust gas flow is more easily and efficiently entrained into the main exhaust gas flow stream. This makes the panel more efficient in terms of the gas flow passing over its surface.

Optionally, the diameter of each of the plurality of second holes is smaller than the diameter of the corresponding one of the plurality of first holes.

This allows the second hole to be cut by a cutting tool which first extends through the first hole in the substrate before encountering and cutting into the material of the applied layer. An advantage of this feature is that the cutting tool which is forming the plurality of second holes will not contact the peripheral surface of the first hole which contact might cause damage to the substrate which in turn might adversely affect the flow characteristics of the gas passing through the hole.

Optionally, each of the plurality of second holes is cut from the second surface of the substrate.

By cutting the plurality of holes from the second surface it becomes possible to minimise the adverse effect of tolerances and scanning errors on the positional accuracy of the plurality of holes.

Optionally, two or more of the first holes are cut simultaneously.

Optionally, two or more of the second holes are cut simultaneously.

In one embodiment, a multi-head drilling machine may be employed to cut several holes simultaneously so making the method of the invention simpler, quicker and therefore more efficient for a user.

Other aspects of the invention provide devices, methods and systems which include and/or implement some or all of the actions described herein. The illustrative aspects of the invention are designed to solve one or more of the problems herein described and/or one or more other problems not discussed.

BRIEF DESCRIPTION OF THE DRAWINGS

There now follows a description of an embodiment of the invention, by way of non-limiting example, with reference being made to the accompanying drawings in which.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION

Figure 1:
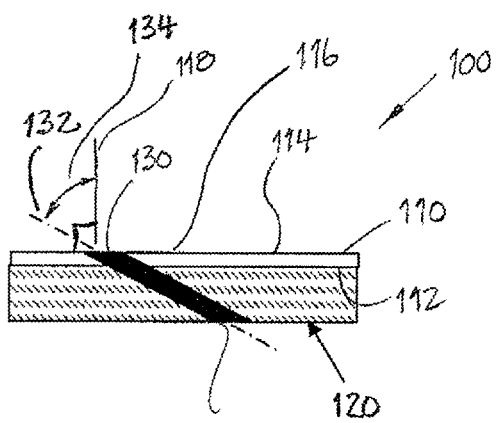
FIG. 1 shows a schematic sectional view of a perforated composite panel formed by the method of the present invention.

Referring to FIG. 1, a perforated composite panel formed by an embodiment of the invention is designated generally by the reference numeral 100.

The perforated composite panel 100 comprises a substrate 110 and an applied layer 120. The substrate 110 has a first surface 112 and an opposite second surface 114. The applied layer 120 extends over and covers the first surface 112 of the substrate 110.

The perforated composite panel 100 forms a liner panel 100 for the exhaust system (not shown) of a gas turbine engine (also not shown). The gas turbine engine is installed in an aircraft (also not shown) but may equally be installed in another form of transport (also not shown) or even in a stationary installation (also not shown) such as, for example, an electrical power generating installation (also not shown).

In the embodiment shown the substrate 110 is formed as a titanium alloy sheet. Alternatively the substrate 110 may be formed from another metal or metal alloy sheet material. In a further alternative the substrate 110 may be formed from a fibre reinforced composite material such as, for example, a carbon fibre reinforced sheet material.

The applied layer 120 is attached to the first surface 112 of the substrate 110 by an adhesive compound. Alternatively the applied layer 120 may be attached to the substrate by an alternative fastening technique such as, for example, with rivets or screws.

Figure 2:
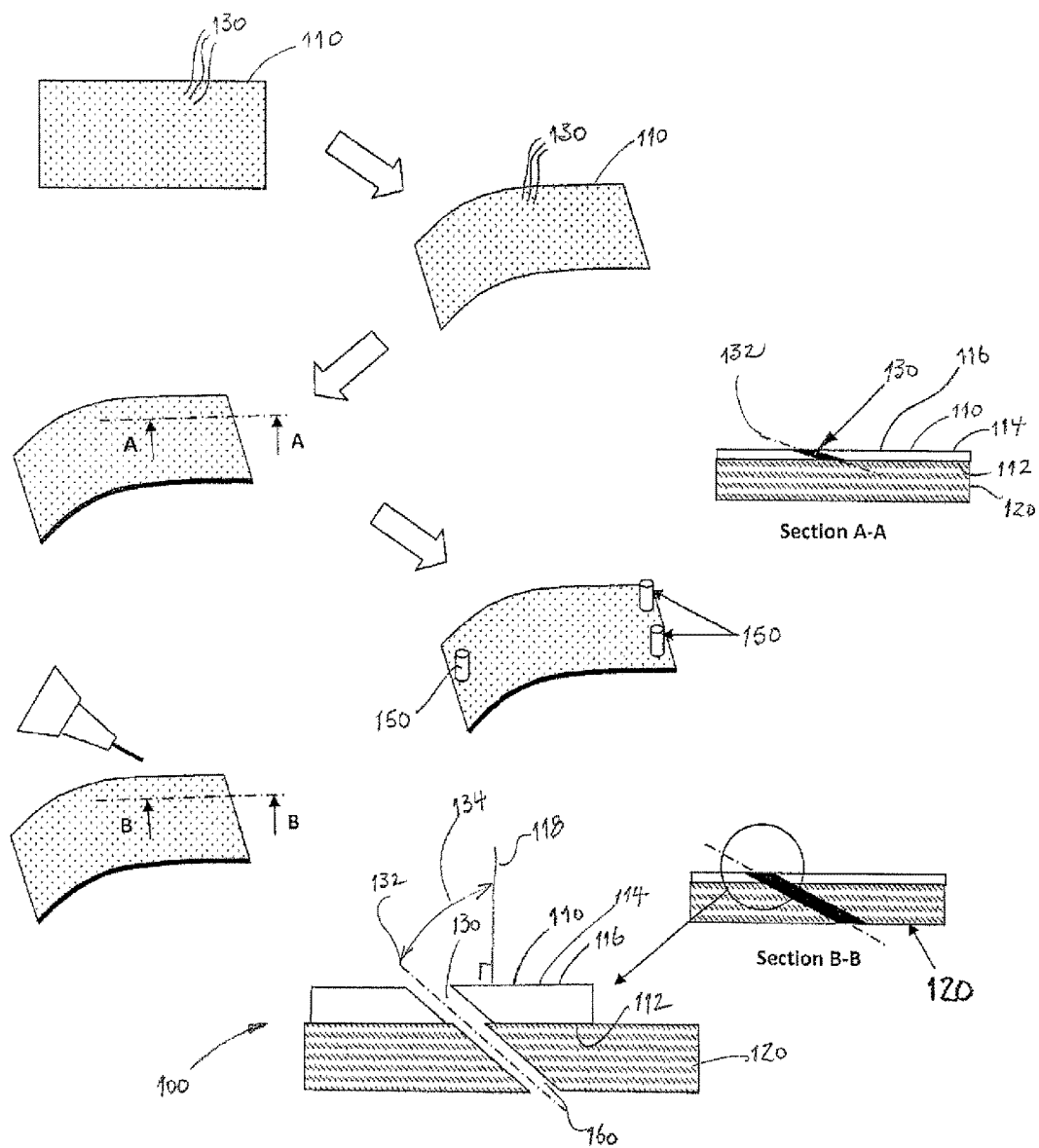
FIG. 2 shows a schematic flow diagram illustrating the method of the present invention.

In the method of the invention a plurality of first holes 130 are formed in the substrate 110. In the method as shown in FIG. 2 the plurality of first holes 130 are formed in the substrate 110 while the substrate 110 is still in its unformed sheet form. Each of the plurality of first holes 130 is formed such that the axis 132 of each first hole 130 is oriented at an acute angle 134 to the normal 118 to the plane 116 of the substrate 110.

In one embodiment of the invention, each of the plurality of first holes 130 is formed at an angle of 70° to the plane 116 of the substrate 110. In other embodiments of the invention, each of the plurality of first holes 130 may be formed at another angle 134 to the normal 118 to the plane 116 of the substrate 110.

The perforated substrate 110 is then formed by any suitable forming technique into a pre-determined three dimensional geometrical form.

In an alternative embodiment of the method of the invention, the substrate 110 may first be formed into the pre-determined three dimensional geometrical form and then subsequently perforated with the plurality of first holes 130.

The step of perforating the substrate 110 with the plurality of first holes 130 may be achieved using any conventional hole forming technique such as, for example, laser forming, electrical discharge machining or mechanical cutting.

At this stage, one or more supports may be attached to the second surface 114 of the substrate 110. In the embodiment shown, the support(s) serve to attach the perforated composite panel 100 to the internal surface (not shown) of the exhaust system.

The assembled composite panel 100 is then located in a fixture (not shown) which enables one or more datum features 150 to be defined on the first surface 112 of the composite panel 100.

The first surface 112 of the composite panel 100 is then scanned in order to identify the positions, and orientation of the corresponding axis, of each of the first holes 130 relative to the or each datum feature 150. In the method of the invention this scanning process is performed by an ultrasound scanning machine. Alternatively another scanning technique may be employed to positionally locate the plurality of first holes 130.

Once the position and orientation of each of the plurality of first holes 130 has been determined then a plurality of second holes 160 may be cut into the applied layer 120 with each of the second holes 160 corresponding to a respective one of the first holes 130. Each of the second holes 160 is cut so as to be concentric with and coaxial with a corresponding one of the first holes 130.

Once the position of each of the first holes 130 has been established each of the second holes 160 can be drilled from either side of the composite panel 100 to produce an aligned combination of corresponding first and second holes 130, 160.

In practice it is likely that each of the second holes 160 is drilled from direction of the second surface 114 of the substrate 110 to minimise the effect of tolerances and scanning error.

Since the applied layer 120 is made from an easily machined material then very small diameter holes can be drilled so a high aspect ratio holes can be produced (aspect ratio being defined as the ratio of the hole's diameter to its length). In other words a high aspect ratio drill is one that is long and thin. Holes below diameters of 0.6 mm could be generated.

Multi head drilling machines could be used to increase manufacturing time. To maximise accuracy the scanning and drilling could be done in stages or small areas at a time with the scanner on the machine or drill head.

In practice the drill used to form each of the second holes 160 may be a little smaller than the diameter of the first hole 130 in the substrate 110 in order to prevent the drill from catching on the sides of the first hole 130 in the substrate 110, which may cause drill damage.

The differences in first hole 130 and second hole 160 diameters will need to accommodate, for example, the effect of positional tolerances and drill wear. Where drill damage does not take place then the drill will be arranged to drill each second hole 160 as near to the first hole 130 in the substrate 110 as practically possible.

Figure 3:
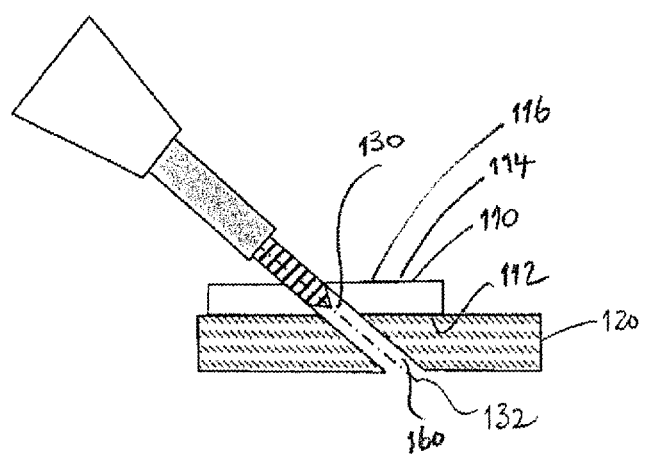
FIG. 3 shows a schematic sectional view of one arrangement of the step of forming a hole through the panel.

FIG. 3 shows the drill passing through a first hole 130 in the substrate 110. Especially if the drill was a hand held then the substrate 110 could be used as a guide for the drill bit. To avoid the drill breaking 'in bending' then a flexible drive member, such as a small diameter rubber tube or proprietary coupling could be placed between the drill and drill bit.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person of skill in the art are included within the scope of the invention as defined by the accompanying claims.

The invention claimed is:

1. A method of producing a perforated composite panel, the composite panel comprising a substrate and an applied layer, the substrate having a first surface and an opposite second surface, the method comprising the steps of:
   i. cutting a plurality of first holes in the substrate;
   ii. positioning the applied layer against the substrate such that a surface of the applied layer overlays the first surface of the substrate to thereby form the composite panel;
   iii. locating one or more datum features on the composite panel;
   iv. determining the location and axis direction for each of the first holes in the substrate, relative to the or each datum feature; and
   v. cutting a plurality of second holes in the applied layer, each of the plurality of second holes being coincident and coaxial with a corresponding one of the plurality of first holes.

2. The method as claimed in claim 1, wherein step ii. comprises the additional subsequent step of:
   ii.' adhesively bonding the surface of the applied layer to the first surface of the substrate.

3. The method as claimed in claim 1, wherein step i. comprises the additional initial step of:
   i.' forming the substrate into a predetermined shape.

4. The method as claimed in claim 1, wherein step i. comprises the additional subsequent step of:
   i.' forming the substrate into a predetermined shape.

5. The method as claimed in claim 1, wherein the substrate is formed from a first material and the applied layer is formed from a second material, a hardness of the first material being greater than a corresponding hardness of the second material.

6. The method as claimed in claim 1, wherein the axis of each of the first holes is inclined at an acute angle to the normal to the plane of the substrate.

7. The method as claimed in claim 1, wherein the diameter of each of the plurality of second holes is smaller than the diameter of the corresponding one of the plurality of first holes.

8. The method as claimed in claim 1, wherein each of the plurality of second holes is cut from the second surface of the substrate.

9. The method as claimed in claim 1, wherein two or more of the first holes are cut simultaneously.

10. The method as claimed in claim 1, wherein two or more of the second holes are cut simultaneously.

* * * * *